Patented Apr. 7, 1936

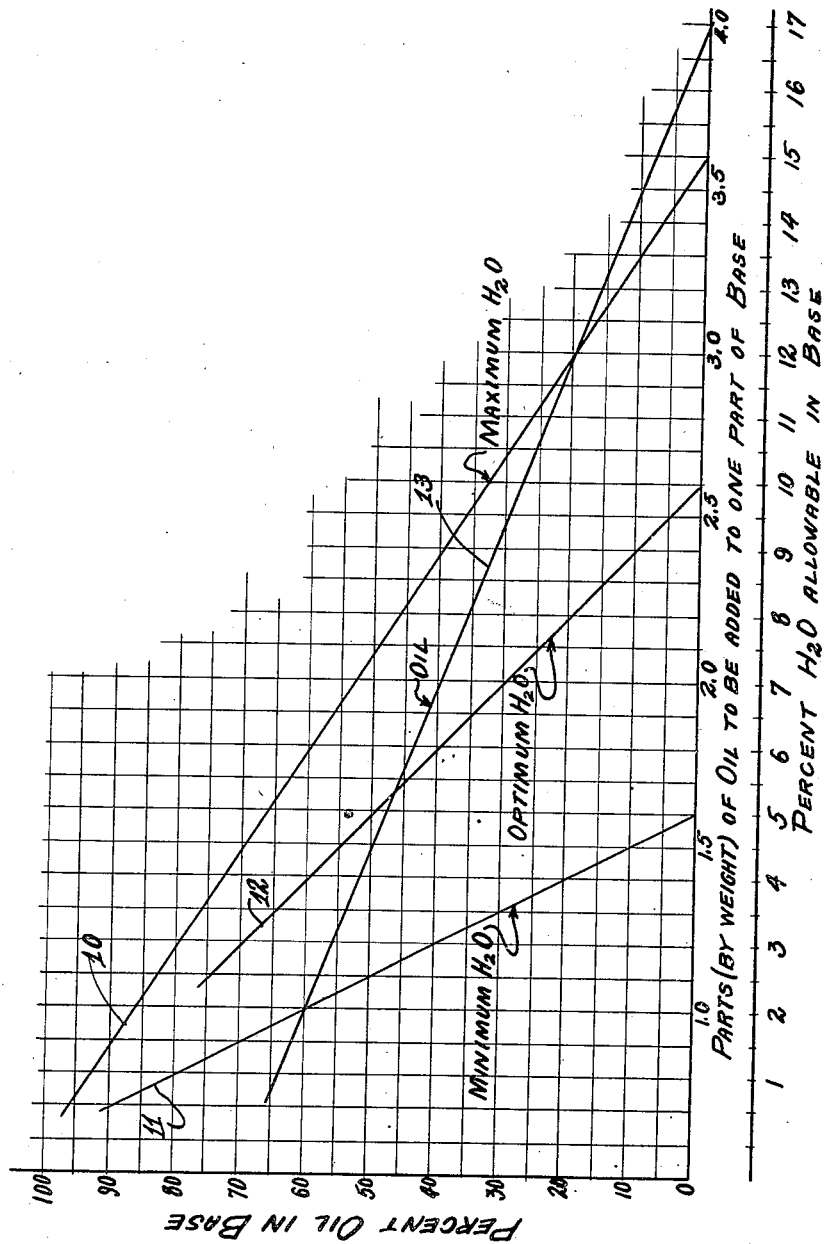

2,036,470

UNITED STATES PATENT OFFICE 2,036,470

EMULSIFIABLE OIL PRODUCT AND PROCESS OF MAKING THE SAME

Norman N. Gay, Berkeley, Calif., assignor to Standard Oil Company of California, San Francisco, Calif., a corporation of Delaware Application October 24, 1931, Serial No. 570,791

14 Claims. (Cl. 87—9)

This invention relates to an improved soluble or emulsifiable oil-soap compound suitable for a number of various uses.

The invention also relates to a method by means of which an oil-soap compound capable of emulsifying quickly and forming a stable and permanent emulsion or suspension, may be produced.

Hereafter the product of this invention will be referred to as a soluble oil, although in effect the product of this invention is not actually soluble but instead capable of being readily and permanently emulsified with water. Furthermore, the term as used herein is to embrace emulsifiable products containing waxes instead of fluid hydrocarbon oils.

The product of this invention may be employed as a cutting oil or metal cutting emulsion for use in the metal trades, or it may be employed as a treating agent for waterproofing or oil treating textiles, fabrics, wood, forms, etc. Furthermore, the product of this invention may either be manufactured in the form of a concentrated soluble base for subsequent dilution with a mineral oil and water, or it may be manufactured in a less concentrated form suitable for dilution with water alone.

Heretofore soluble oils (oils which are capable of readily mixing and emulsifying with water) have been prepared from certain oil soluble alkali salts of the so-called "sulfonic acids" produced in the refining of petroleum distillates with fuming sulfuric acids. Oil soluble alkali salts of sulfonic acids thus produced are known in the industry as "white-oil soaps". Certain disadvantages, however, obtain through the use of these soaps as emulsifying agents. For example, upon mixing the said white-oil soaps with mineral oil, separation of a part of the soap takes place upon standing, the amount of separation increasing with time. Furthermore, products prepared with the use of alkali salts of the so-called sulfonic acids do not emulsify readily and easily with water but instead require considerable agitation or stirring in order to obtain the desired emulsion.

Moreover, an emulsion thus formed is not stable or relatively permanent but instead tends to separate into layers of oil and of water within a relatively short time. Some separation, for example, takes place within one-half hour and in a period of 12 to 24 hours, separation may be practically complete.

This invention relates to an improved soluble oil or oil-soap compound which readily emulsifies with water to form a stable and permanent emulsion. It has been found that the disadvantages and defects inherent through the use of white-oil soaps, may be overcome by the use of relatively small amounts of alkali rosin soaps in conjunction with the white-oil soaps, particularly when such alkali rosin soaps are incorporated in the product in accordance with certain procedural precautions and conditions set forth in detail hereinafter.

It is an object of this invention to disclose and provide a soluble oil suitable for use in water emulsion as a metal cutting oil, wool oil, disinfectant spray oil, wood treating oil, etc.

Another object of this invention is to disclose and provide a soluble oil which may stand in contact with the air for extended periods of time without separation or deposition of solid or semisolid matter from it.

It is a further object of this invention to disclose and provide a soap-hydrocarbon compound capable of being dissolved in water and maintaining in permanent suspension and emulsion, of considerable quantities of oil, wax or other hydrocarbon.

It is another object of this invention to disclose and provide a soluble oil which emulsifies with water very readily with but gentle agitation and which is capable of producing a relatively permanent emulsion, even with relatively hard mineral or ground waters, without the separation or deposition of any of the constituent soaps from the emulsion.

It is a still further object of this invention to disclose and provide an oil-soap compound in concentrated form which may subsequently be diluted with mineral oil in order to produce a soluble oil of the class described.

Another object of this invention is to disclose and provide a method by means of which stable and easily soluble oil-soap compounds may be produced.

An object of this invention is to disclose and provide a method whereby soap-hydrocarbon compounds in which the hydrocarbon is a wax or mixture thereof may be prepared, the soap-hydrocarbon compounds being capable of being readily dispersed in water to form a stable emulsion and/or suspension.

A still further object is to disclose a particular method of combining ingredients under particular conditions and in certain preferred quantities whereby an improved soluble oil may be manufactured.

These and other objects, uses and advantages of this invention will become apparent to those skilled in the art from a contemplation of the invention as described hereinabove and from a consideration of certain specific examples recited hereinafter for illustrative purposes.

In describing the invention, reference will be had to the appended diagram which sets forth water content limits of the soluble oil products manufactured in accordance with this invention.

In general, the products of this invention are produced by heating soaps of sulfonic acids (white-oil soaps), dissolving a rosin in such soaps, and saponifying the rosin acids in the presence of the sulfonic soaps. More or less mineral oil may be present during the saponification but the product should contain a certain optimum moisture content. Furthermore, the ratio between sulfonic soaps and rosin soaps should also bear a certain optimum relationship. Hereafter, for purposes of lucidity, by referring to an oil-soap base or soluble oil base, reference will be had to compounds containing more than 40% of soaps and less than 60% of oil. By merely referring to a soluble oil, reference will be had to those products which contain less than 40% of soap and more than 60% of oil. The soluble oil base is generally a plastic solid necessitating warming to a temperature of 130–150° F. in order to render the same liquid sufficient for dilution with additional oil or water.

The white-oil soaps are formed upon the treatment of petroleum lubricating oil distillates and the like with one or more successive applications of fuming sulfuric acid, the sludge formed being usually drawn off after each such acid treatment. In the residual acid treated oil there are present certain oil soluble reaction products known as sulfonic or sulfoacids. The oils containing such acids may then be neutralized with caustic soda solution and the alkali sulfonates formed then extracted from solution in the oil by means of alcohol, the alcohol itself being later removed by distillation. The formation and separation of these alkali sulfonates is described in detail in United States Patent #1,286,179 issued to R. E. Humphreys. The alkali soaps so formed are called "white-oil soaps" and may be employed in the process of this invention.

As ordinarily obtained, these white-oil soaps contain some water, in certain instances as much as 20% to 25%. Furthermore, they also usually contain some mineral oil. The water may be removed in part before the utilization of the soaps in the process of this invention or it may be removed in part in the process of manufacture of the soluble oil or soluble oil base, as described hereinafter in detail. The mineral oil, however, may well be allowed to remain and becomes a part of the mineral oil comprising the soluble oil base or completed soluble oil of the invention.

White-oil soaps of the character described hereinabove, may then be heated to about 200° F. and lump or granular or powdered rosin added thereto. Although low grade lump rosins have been successfully employed, a high grade rosin such as grade "N", is preferred because of its greater uniformity of color and properties. Kidney rosin oils have been used successfully except for a material which separates on the bottom of the containers after making the emulsion and for certain uses such a deposition would be disadvantageous.

The rosin is added to the white-oil soaps in the proportion of between about 0.4 and 0.8 to one part of white oil soaps, calculated on an anhydrous oil free base. The rosin is preferably added slowly and the mixture stirred from time to time to allow the rosin to melt and become evenly distributed. Thereafter flake caustic potash or caustic soda or a strong solution thereof, is added to the melted mixture of white-oil soaps and rosin, the potash or soda being added in an amount sufficient to saponify the rosin acids, calculated from the saponification value of the rosin used. If, however, the white-oil soaps used contain free caustic soda, it is necessary to deduct an amount of caustic soda or caustic potash equivalent to such free caustic soda in the white-oil soaps, as it has been found that the product, after saponification of the rosin acids, should be substantially neutral (substantially free from unsaponifiable matter or free alkali) in order to obtain optimum results.

During saponification of the rosin acids in the presence of the white-oil soaps, the temperature is preferably raised to between 225 to 250° F. and stirring is continued at this temperature until a sample of the mixture when dissolved in alcohol is neutral to phenol phthalein. It is desirable to raise the temperature of the saponifying mixture as rapidly as possible without permitting it to boil over, inasmuch as the time required to saponify the rosin is greatly accelerated by rise in temperature. For example, the rosin may be completely saponified in two hours at 240° F. whereas at 212° F., nine hours would be required.

If a soluble oil base is being prepared (containing less than about 60% of oil and over 40% of soaps), sufficient water is left in the product to produce a soluble oil base containing from 0.5 to 6% of water (at 60% oil content). This water content will vary, depending upon the amount of oil in the finished soluble oil base. The water content is important as it has been found that if too little water is present, the soaps will not stay in solution with the oil when the soluble oil base is subsequently diluted with oil and if too much water is present, the finished soluble oil will be cloudy. The graph attached hereto discloses the maximum and minimum water contents of soluble oil compounds made in accordance with this invention. The curve 10 gives the maximum limit and the curve 11 gives the minimum limit of water content in percentage of the base.

It will thus be seen that when the base contains 30% of oil, the percentage of water allowable in such base may vary from 3½% to 10½%. The optimum water content is indicated by the line 12 and with a base having an oil content of 30%, the optimum water content is 7%.

The amount of rosin which may be used has been found to vary with the source and character of the white-oil soaps. Generally, however, from 0.4 to 0.8 parts of rosin to one part of white-oil soaps produces a satisfactory soluble oil. By reason of slight variations in the composition of the white-oil soaps, however, it is preferred to use an average ratio of rosin, that is, about 0.6 or more particularly, 0.61, and satisfactory soluble oils may usually be prepared when using this proportion of ingredients, variation in the particular white-oil soaps used not affecting the result appreciably.

The base prepared as hereinabove described may now be mixed with a mineral oil or it may be allowed to cool to form a plastic solid, at ordinary temperatures. Such soluble oil base may be diluted with oil at any stage but in order to incorporate the mineral oil diluent therewith, it may be necessary to warm the base to about 140 or 150° F. in order to liquefy it. A mineral oil of any desired character may be employed as a diluent. Light refined oils, such as illuminating oils, may be emulsified with this base or heavier oils, such as oils having a viscosity of 500 or even 600 or more seconds Saybolt at 100° F. may be used.

As hereinafter explained, hydrocarbon oils of low specific gravity and low viscosity, such as gasolines, kerosenes and gas oils, and waxes, such as carnauba wax and candelilla wax and mixtures of them with paraffin waxes, may be used to replace the mineral oils of the lubricating oil range largely used in products of this class.

Soluble oil compounds prepared as described hereinabove, may be employed in any suitable manner, that is, they may be diluted with additional quantities of mineral oil or they may be diluted with 9 or more parts of water so as to form a suitable spraying composition or mineral cutting oil.

The complete method of manufacture of the soluble oils of this invention may be illustrated by the following example:

A white-oil soap having the following analysis was employed:

|  | Per cent |
|---|---|
| Sulfonic acids | 34.90 |
| Mineral oil | 37.20 |
| Sodium sulfate | 2.30 |
| Free NaOH | 0.35 |
| Water | 21.50 |

The percentage of sulfonic acids in the above analysis is based on the molecular weight basis of 430 and by multiplying the precent of sulfonic acids by 1.05, the percentage of actual anhydrous sodium soaps of such acids is obtained, namely, 36.65% sodium sulfonate.

1,000 pounds of white-oil soaps were heated to about 200° F. and 224.3 pounds of rosin added, the mixture being stirred until a homogeneous mass was obtained. The quantity of rosin was obtained by using a proportion of 0.61 parts of rosin to one part of anhydrous sulfonates. The temperature of the mixture was then raised to about 240–250° F. and 48° Bé. caustic potash added with continued agitation, the supply of heat being regulated so that the mixture did not boil over the vessel. The amount of potash required to give a neutral product was calculated as follows:

The saponification value of the rosin used was 180 Mgm. KOH per gram of rosin. 48° Bé. potash lye contains 0.4684 pounds KOH per pound of solution. Thus:

$$\frac{224.3 \times 0.18}{0.4684} = 86.2 \text{ pounds } 48° \text{ Bé. KOH}$$

The crude white-oil soaps contain 0.35% free NaOH and in order to obtain a neutral saponification mixture, an amount of potash lye equivalent to 3.5 pounds of NaOH must be deducted. The actual amount of potash lye, therefore, added was 75.7 pounds.

In making up the batch, therefore, with 1,000 pounds of crude white-oil soaps, 224.3 pounds of rosin and 75.7 pounds of 48° Bé. KOH were mixed, giving a total of 1300 pounds. During the heating and saponification, however, some water is evaporated from the mixture comprising the soluble oil base and it is desirable to ascertain whether or not the water content of the base is within the range suitable to give a satisfactory finished oil product.

Upon analysis, the base described hereinabove was found to contain 9% of water. The quantity of water permitted in the base, however, varies with the oil content and in order to determine the oil content, the following computation may be used:

Let "Y" equal the amount of water evaporated during the saponification.—

$$\frac{(\text{total weight of water at the start}) - Y}{(\text{total weight of batch at the start}) - Y} = 0.09$$

The total amount of water at the start is computed from the analysis of the white-oil soaps and the density of the caustic potash solution and under the conditions of the above example amounted to 256.3 pounds. By the use of the above equation, it was found that the amount of water evaporated was 163 pounds.

From these figures the percent of oil in the base may be computed and it will be found that 32.8% of oil remained in the base at the completion of the saponification. Subtracting 163 pounds from 1300 (the total weight of the batch at the start) gives the weight of the base produced or 1137 pounds. By referring to the attached diagram, it is found that a base containing 32.8% of oil may contain from 3.3% of water (curve 11) to 10% of water (curve 10) and still give a suitable soluble oil when diluted with mineral oil. The batch described here was found to contain 9% of water and is therefore satisfactory for use as it is within the range which has been found suitable in actual practice.

In the attached diagram there is also provided means for practically and readily ascertaining the amount of mineral oil to be added in order to complete the batch of soluble oil in the event that the completed soluble oil product is to contain, say 80%, of mineral oil. In the illustrative example described specifically hereinabove, the base contained 32.8% of oil at the time the saponification was completed.

By referring to the curve 13 of the attached graph, it will be found that for a base containing 32.8% of oil, 2.38 parts of mineral oil by weight may be added to one part of the base to give a finished soluble oil product containing 80% total mineral oil. Curves similar to curve 13 may be computed so as to permit ready determination of parts of oil to be added to one part of the base to make a soluble oil containing 75%, 85%, or any other desired quantity of oil. In the manufacture of the batch described, 2.38 parts of mineral oil by weight were added to one part of the base while stirring the mixture, the temperature gradually decreasing during the addition of the oil, and at the end of the additive process the temperature was sufficiently low to permit the completed soluble oil to be drawn off into containers ready for use.

The total ingredients and percentage composition of the final and completed soluble oil may be tabulated as follows:

|  | Pounds | percent |
|---|---|---|
| Mineral oil (from white-oil soaps and added oil) | 3078 | 80.2 |
| Anhydrous white-oil soaps | 366.5 | 9.6 |
| Rosin | 224.3 | 5.9 |
| KOH | 35.4 | 0.92 |
| NaOH | 3.5 | 0.09 |
| Na₂SO₄ | 23.0 | 0.6 |
| Water | 101.4 | 2.7 |

Another illustrative batch was made from 1,000 lbs. of crude white-oil soaps containing 55.65% sodium sulfonate, 7.96% of oil, 23% of water and 2.35% sodium hydroxide. The oil-soap product was made by adding 340.6 lbs. of rosin and 60.6 lbs. of 48° KOH. It was calculated that 149.4 lbs. of water had been evaporated during the saponification, producing 1251.8 lbs. of oil soap-base containing 6.4% oil. The base was found to contain 9% water and by referring to Fig. 1, it was found that such water content is entirely satisfactory. The amount of oil which could be added to this base in order to produce a finished soluble oil containing a total of 80% of oil, was found to be 3.66 parts of oil to 1 part of base or 4582 lbs. of oil to the 1252 lbs. of base as prepared.

In the event that the water content of the base prepared does not fall within the maximum and minimum allowable as shown on the attached graph, it may be corrected in either direction to conform with these limitations, as these limitations as to water content have been found to be limitations of importance.

Thus, as has been stated hereinbefore, it has been found that if too little water is present, the soaps will not stay in solution with the oil when finally mixed and allowed to stand, and if too much water is present in the base, the finished soluble oil will be cloudy.

Ordinarily, if the soluble oil bases are prepared in the manner described, they will be suitable without further adjustment. If, however, the directions are not closely followed or if mistakes are made in the analyses or calculations, certain corrective measures may be used to bring the batch back into satisfactory shape again. These corrective measures are ordinarily best applied to the base before the addition of the greater part of the oil, and for this reason it is well to take a trial sample of the finished base before completing the addition of the oil. From this trial sample, the behavior of the large batch may be predicted.

To such a trial sample containing, let us say, 80% of mineral oil, 9 parts of water may be added and the mixture shaken until all of the oil is emulsified. If the oil-soap base was properly made, it should emulsify readily. A bluish tint in a thin film of the emulsion is usually indicative of permanent emulsion. If, however, a creamy "cuff" separates on the top of the emulsion, insufficient rosin is present.

If a cuff forms, the emulsion may be centrifuged to determine the per cent of cuff or froth by volume. There is a relation between the percentage of cuff on top of the emulsion thus made, with the amount of increase in the percentage of rosinate necessary to reduce the percentage of cuff to zero. For example, when an oil-soap material containing 80% oil is diluted with 9 parts of water and centrifuged at 2000 R. P. M. for 15 minutes, 2% of cuff indicates that it is necessary to increase the percentage of rosinate 0.6% in order to reduce the cuff to zero. When the percentage of cuff on top of the emulsion is 5%, then 0.9% increase in rosinate is required. When the percentage of cuff is 10%, then the increase in the percentage of rosinate is 1.15. If it is necessary to add more rosin, then the calculated amount of KOH or of NaOH must also be added in order to saponify it since, as has already been stated, the product should be substantially neutral.

If an oil separates on top of the emulsion when a diluted sample of the soap-oil product is centrifuged, insufficient white-oil soaps are present in the base and more white-oil soaps are required. If more white-oil soaps are added, however, then sufficient rosin should also be added to neutralize the free alkali in the white-oil soaps.

In the example specified above, the rosin was saponified with caustic potash. It is to be understood, however, that caustic soda may be used in place of caustic potash and satisfactory emulsions obtained. Caustic potash is preferred, however, due to the greater solubility of potash soaps in water.

When preparing soluble oils with mineral oils of low specific gravity and low viscosity, such as gasolines, kerosenes and gas oils, certain modifications in the proportions of rosin to white-oil soaps have been found necessary in order to produce oils that will make stable emulsions. The ratio of rosin to white-oil soaps has been determined as usually varying between 0.2 and 0.6 depending largely on the source of the white-oil soaps used. For example, a soap produced from a distillate with a Saybolt universal viscosity of 250-300 seconds at 100° F. will require the maximum amount of rosin, and a soap produced from a distillate with a Saybolt universal viscosity of 50-75 seconds at 100° F. will require the minimum amount of rosin.

Moreover, in making emulsions with soluble oils containing gasoline, kerosene, and gas oil, it has been found necessary to add slowly about an equal volume of water to the soluble oil with constant stirring. After this amount of water has been added, further dilution with water can be made without any special precautions.

In preparing emulsifiable waxes or wax mixtures, the ratio of rosin to white-oil soaps varies over a wide range. Thus a white-oil soap produced from a relatively heavy distillate, for example 250-300 seconds Saybolt universal at 100° F., will require the maximum rosin compounding, and in this case the ratio of rosin to white-oil soaps may be as high as 0.8. A white-oil soap prepared from a light distillate, for example 50-75 seconds Saybolt universal at 100° F., will not require any rosin soap compounding. Soaps prepared from distillates of intermediate viscosities will require intermediate ratios of rosin, etc.

The method of manufacture of the base for emulsifiable wax products is the same as for soluble oils, as described above. The wax or wax mixture is added to the base in the molten state and is considered the same as an oil. The method of producing the wax emulsion, however, is quite different. In this case, the emulsifiable wax product is melted at about 190° F., more or less, and poured into water at or near the boiling point. Stable wax emulsions are produced in this manner.

Carnauba wax or candelilla wax may be substituted in toto for the mineral oils in the examples cited above in this specification for the production of soluble oils of the usual class. While paraffin waxes may be used in large part, it has been found that when made up entirely of waxes (except the oil which may be present in the crude white-oil soaps), some carnauba or candelilla must be present. For example, when preparing an emulsifiable product containing about 80% of hydrocarbon material, it has been found that about 7½% of carnauba wax or of candelilla wax must be present; the remainder of the hydrocarbon material may be ordinary paraffin wax.

Any mixture which gives a finished product containing more than about 7½% of carnauba or candelilla, with correspondingly lesser amounts of paraffin wax, is of course suitable, and stable emulsions will be formed. Emulsions of waxes such as are here described, are satifactory for the impregnation of wood, paper, textiles, etc.

It will be seen, therefore, that an oil soap compound has been provided which is capable of emulsifying quickly and forming a suitable and permanent emulsion or suspension when diluted with appreciable quantities of water. Furthermore, a method of preparing such compounds has been described in detail, together with procedural steps which insure the preparation of a desirable product. It is to be understood, however, that the invention is not limited to precisely the steps disclosed or to the ingredients mentioned in the illustrative examples, inasmuch as numerous changes may be made, as will be evident to those skilled in the art.

All such changes and modifications as come within the scope of the appended claims are embraced thereby.

I claim:

1. A substantially neutral and stable oil-soap compound adapted to form a substantially stable emulsion upon dilution with water, comprising: 10% to 95% of a mixture of oil soluble, alkali metal salts of petroleum sulfonic acids and water soluble alkali metal rosin soaps, in a ratio of between about 0.2 and 0.8 parts of water soluble rosin soaps to one part of sulfonic acid soaps on an anhydrous, oil-free basis; said compound being substantially free from unsaponified saponifiable matter and containing 5% to 90% of a mineral oil, and not more than about 14.5% of water.

2. A substantially neutral and stable oil-soap compound adapted to form a substantially stable emulsion upon dilution with water, comprising: 10% to 95% of a mixture of oil soluble, alkali metal salts of petroleum sulfonic acids and water soluble alkali metal rosin soaps, in a ratio of between about 0.2 and 0.8 parts of water soluble rosin soaps to one part of sulfonic acid soaps on an anhydrous, oil-free basis; said compound being substantially free from unsaponified saponifiable matter and containing 5% to 90% of a mineral oil, and water in quantity varying from about 0.5% to 1.5% at 90% oil content and from 4.5% to 14.5% at 5% oil content.

3. A substantially neutral and stable oil-soap compound adapted to form a substantially stable emulsion upon dilution with water, comprising: 10% to 40% of a mixture of oil soluble, alkali metal salts of petroleum sulfonic acids and water soluble alkali metal rosin soaps, in a ratio of between about 0.2 and 0.8 parts of water soluble rosin soaps to one part of sulfonic acid soaps on an anhydrous, oil-free basis; said compound being substantially free from unsaponified saponifiable matter and containing 60% to 90% of a mineral oil, and containing water in quantity varying from about 0.5% to 1.5% of water at 90% oil content and from 2% to 6% of water at 60% oil content.

4. A substantially neutral and stable oil-soap compound adapted to form a substantially stable emulsion upon dilution with water, comprising: 40% to 95% of a mixture of oil soluble, alkali metal salts of petroleum sulfonic acids and water soluble alkali metal rosin soaps, in a ratio of between about 0.2 and 0.8 parts of water soluble rosin soaps to one part of sulfonic acid soaps on an anhydrous oil-free basis; said compound being substantially free from unsaponified saponifiable matter and containing 5% to 60% of mineral oil, and containing water in quantity varying from 2% to 6% of water at 60% oil content and from 4.5% to 14.5% of water at 5% oil content.

5. A substantially neutral and stable oil-soap compound adapted to form a substantially stable emulsion upon dilution with water, comprising: 10% to 95% of a mixture of oil soluble, alkali metal salts of petroleum sulfonic acids and water soluble alkali metal rosin soaps, in a ratio of between about 0.2 and 0.8 parts of water soluble rosin soaps to one part of sulfonic acid soaps on an anhydrous oil-free basis; 5% to 90% of a mineral oil, and water varying in quantity from about 0.5% to 1.5% at 90% oil content and from about 4.5% to 14.5% at 5% oil content.

6. A substantially neutral and stable oil-soap compound adapted to form a substantially stable emulsion upon dilution with water, comprising: 10% to 95% of a mixture of oil soluble, alkali metal salts of petroleum sulfonic acids and water soluble alkali metal soaps, in a ratio of between about 0.2 and 0.8 parts of water soluble soaps to one part of sulfonic acid soaps on an anhydrous oil-free basis; 5% to 90% of a mineral oil, and water in quantity varying from about 0.5% to 1.5% at 90% oil content and from 4.5% to 14.5% at 5% oil content.

7. A substantially stable hydrocarbon-soap compound adapted to form a stable emulsion upon dilution with water, consisting essentially of: 10% to 95% of a mixture of oil soluble alkali metal salts of petroleum sulfonic acids and water soluble alkali metal rosin soaps, in a ratio of between about 0.2 and 0.8 parts of water soluble rosin soaps to one part of sulfonic acid soaps on an anhydrous oil-free basis; 5% to 90% of hydrocarbon; and water in quantity varying from about 0.5% to 1.5% of water at 90% hydrocarbon content to from about 4.5% to 14.5% of water at 5% hydrocarbon content.

8. A substantially stable hydrocarbon-soap compound adapted to form a stable emulsion upon dilution with water, consisting essentially of: 10% to 95% of a mixture of oil soluble alkali metal salts of petroleum sulfonic acids and water soluble alkali metal rosin soaps, in a ratio of between about 0.2 and 0.8 parts of water soluble rosin soaps to one part of sulfonic acid soaps on an anhydrous oil-free basis; 5% to 90% of hydrocarbon from the group consisting of mineral oil and hydrocarbon waxes; and water in quantity varying from about 0.5% to 1.5% of water at 90% hydrocarbon content to from about 4.5% to 14.5% of water at 5% hydrocarbon content.

9. A substantially stable hydrocarbon-soap compound adapted to form a stable emulsion upon dilution with water, consisting essentially of: 40% to 95% of a mixture of oil soluble alkali metal salts of petroleum sulfonic acids and water soluble alkali metal rosin soaps, in a ratio of between about 0.2 and 0.8 parts of water soluble rosin soaps to one part of sulfonic acid soaps on an anhydrous oil-free basis; 5% to 60% of hydrocarbon from the group consisting of mineral oil and hydrocarbon waxes; and water in quantity varying from about 2.0% to 6% of water at 60% hydrocarbon content to from about 4.5% to 14.5% of water at 5% hydrocarbon content.

10. A substantially stable hydrocarbon-soap compound adapted to form a stable emulsion upon dilution with water, consisting essentially of: 10% to 40% of a mixture of oil soluble alkali metal salts of petroleum sulfonic acids and water soluble alkali metal rosin soaps, in a ratio of between about 0.2 and 0.8 parts of water soluble rosin soaps to one part of sulfonic acid soaps on an anhydrous oil-free basis; 60% to 90% of a hydrocarbon from the group consisting of mineral oil and hydrocarbon waxes; and water in quantity varying from about 0.5% to 1.5% of water at 90% hydrocarbon content to from about 2% to 6% of water at 60% hydrocarbon content.

11. A substantially stable hydrocarbon-soap compound adapted to form a stable emulsion upon dilution with water, consisting essentially of: 10% to 95% of a mixture of oil soluble alkali metal salts of petroleum sulfonic acids and water soluble alkali metal soaps, in a ratio of between about 0.2 and 0.8 parts of water soluble soaps to one part of sulfonic acid soaps on an anhydrous oil-free basis; 5% to 90% of a hydrocarbon; and water in quantity varying from about 0.5% to 1.5% of water at 90% hydrocarbon content to from about 4.5% to 14.5% of water at 5% hydrocarbon content, said compound being substantially neutral and substantially free from unsaponified saponifiable matter and free alkali.

12. A substantially stable hydrocarbon-soap compound adapted to form a stable emulsion upon dilution with water, consisting essentially of: 10% to 95% of a mixture of oil soluble alkali metal salts of petroleum sulfonic acids and water soluble alkali metal soaps, in a ratio of between about 0.2 and 0.8 parts of water soluble rosin soaps to one part of sulfonic acid soaps on an anhydrous oil-free basis; 5% to 90% of carnauba wax, said compound being substantially neutral and substantially free from unsaponified saponifiable matter and free alkali.

13. A substantially stable hydrocarbon-soap compound adapted to form a stable emulsion upon dilution with water, consisting essentially of: 10% to 95% of a mixture of oil soluble alkali metal salts of petroleum sulfonic acids and water soluble alkali metal soaps, in a ratio of between about 0.2 and 0.8 parts of water soluble soaps to one part of sulfonic acid soaps on an anhydrous oil-free basis; 5% to 90% of carnauba wax; and water in quantity varying from about 0.5% to 1.5% of water at 90% wax content to from about 4.5% to 14.5% of water at 5% wax content; said compound being substantially neutral and substantially free from unsaponified saponifiable matter and free alkali.

14. A substantially stable hydrocarbon-soap compound adapted to form a stable emulsion upon dilution with water, consisting essentially of: 10% to 95% of a mixture of oil soluble alkali metal salts of petroleum sulfonic acids and water soluble alkali metal rosin soaps, in a ratio of between 0.2 and 0.8 parts of water soluble rosin soaps to one part of sulfonic acid soaps on an anhydrous oil-free basis; 5% to 90% of a mixture of paraffin and vegetable wax; and water in quantity varying from about 0.5% to 1.5% of water at 90% wax content to from about 4.5% to 14.5% of water at 5% wax content.

NORMAN N. GAY.